(12) United States Patent
Bitner

(10) Patent No.: US 6,444,005 B1
(45) Date of Patent: Sep. 3, 2002

(54) FILTER ENGAGEMENT DEVICE

(75) Inventor: Glenn W. Bitner, Alsip, IL (US)

(73) Assignee: Venturedyne, Ltd., Milwaukee, WI (US)

( * ) Notice: Subject to any disclaimer, the term of this patent is extended or adjusted under 35 U.S.C. 154(b) by 0 days.

(21) Appl. No.: 09/638,247

(22) Filed: Aug. 14, 2000

(51) Int. Cl.[7] .............................................. B01D 29/96
(52) U.S. Cl. ......................................... 55/480; 55/482
(58) Field of Search .................... 55/378, 478, 480, 55/481, 482, 483, 508

(56) References Cited

U.S. PATENT DOCUMENTS

| 1,295,711 A | 2/1919 | Dod |
| 2,220,347 A | 11/1940 | Nutting |
| 3,486,310 A | 12/1969 | Nilsson |
| 4,217,116 A | 8/1980 | Seever |
| 4,264,345 A | 4/1981 | Miller |
| 4,298,362 A | 11/1981 | Krull |
| 4,309,200 A | 1/1982 | Heffernan |
| 4,334,896 A | 6/1982 | Muller |
| 4,435,197 A | 3/1984 | Nijhawan |
| 5,261,934 A | * 11/1993 | Shutic et al. ................. 95/280 |
| 5,599,364 A | 2/1997 | Hawkins |
| 5,611,922 A | * 3/1997 | Stene ......................... 210/238 |
| 5,746,796 A | * 5/1998 | Ambs et al. .................. 55/493 |
| 5,993,519 A | 11/1999 | Lim |

* cited by examiner

Primary Examiner—Robert A. Hopkins
(74) Attorney, Agent, or Firm—Jansson, Shupe & Munger, Ltd.

(57) ABSTRACT

A device for sealing filters in a dust collector. The preferred dust collector has a housing enclosing clean-air and dirty-air chambers, a support base in the housing having a support side and an opposite side, and a contact surface spaced from the support base and facing the support side. A filter is positioned between the contact surface and support side. A push, lift or hold-release device is provided to secure the filter in sealed engagement with the support side and the contact surface. In a "hold" position, said device secures the filter with respect to the housing. In a "removal" position, said device permits the filter to be removed from the housing.

18 Claims, 3 Drawing Sheets

US 6,444,005 B1

FILTER ENGAGEMENT DEVICE

FILED OF THE INVENTION

This invention relates generally to filtration apparatus and, in particular, to filtration apparatus including filter engagement structure.

BACKGROUND OF THE INVENTION

Dust collectors are used to filter particulates out of air that is drawn from various sources including fume and ventilation hoods used in industrial applications such as welding and chemical and pharmaceutical In known dust collectors, the process of replacing a stack of filter cartridges requires the operator to release the mechanical sealing force on a stack of filter cartridges, physically remove the top filter cartridge directly under the top wall or cage plate, and also remove the remaining bottom cartridge stack. The operator then places a clean filter cartridge on the top of the support-base plate and a second clean filter cartridge onto the top of the first clean filter cartridge so that both filter cartridges are sitting end to end in a vertical direction which defines a single stack of cartridges. Once the cartridges are inserted, it becomes necessary to create a seal between the cartridges and between the cartridge top wall or cage plate.

Various devices are known in the art for sealing filter cartridges into position in a dust collector. U.S. Pat. No. 5,599,364 (Hawkins) discloses a parallel pair of filter trays which support the mounting plate of the cylindrical filters thereby supporting the filters themselves. The filter trays interact with support brackets mounted on the partition between the "clean" and "dirty" sections of the dust collector. These support brackets are designed so as to lock the filters snugly against the partition when the trays are slid in one direction, and release the filters when the trays are moved in the opposite direction. A shortcoming of the Hawkins device is that it is not designed to accommodate filters stacked on top of each other, nor does it make it easy to replace a particular filter as it is not easy to access a filter located in the interior of the group of filters supported on a particular pair of trays.

U.S. Pat. No. 4,435,197 (Nijhawan et al.) discloses a baghouse filter in which the partition which mounts the filter bags is formed integrally with the access door of the housing. Such an arrangement allows for the filter bags to be exposed for servicing when the access door is displaced. This arrangement, however, does not allow for a plurality of filters to be stacked in the housing. Furthermore, it requires that the filters be lifted up through the top of the housing, thereby making it more difficult for an operator to access filters that need replacing.

A device that would allow for easy access to, and removal of, used filters as well as assist an operator in applying force to the cartridges in order to generate a seal between the filters and wall or partition surfaces would be an important improvement in the art.

OBJECTS OF THE INVENTION

An object of the invention is to provide a filter engagement device that overcomes some of the problems and shortcomings of the prior art.

Another object of the invention is to provide a filter engagement device that mechanically lifts, engages, and holds one or more filter cartridges in a dust collector.

Yet another object of the invention is to provide a filter engagement device that mechanically lifts, engages, and holds a vertically positioned filter cartridge in a dust collector.

Still another object of the invention is to provide a filter engagement device that allows a stack of vertically positioned filter cartridges to be lowered into a "removal" position in a dust collector.

How these and other objects are accomplished will become apparent from the following descriptions and from the drawings.

SUMMARY OF THE INVENTION

The invention relates to a dust collector comprising a housing enclosing clean-air and dirty-air chambers and a push, lift or hold-release device provided to engage filter structure within the collector. The collector preferably includes a support base in the housing having a support side and an opposite side, and a contact surface spaced from the support base and facing the support side. A filter is engaged between the support side and the contact surface. The push, lift or hold-release device is provided to secure the filter between a "hold" position in which the filter is secured in sealed engagement with the support side and the contact surface and a "removal" position in which said device permits the filter to be removed from the housing.

In one embodiment of the invention, the contact surface includes an opening in communication with a clean-air chamber, the support base has an outer edge and a plurality of guide pins are located around the outer edge such that a filter positioned on the support base between the guide pins is centered with respect to the opening in the contact surface.

In another embodiment of the invention, the push device is further comprised of an engage-pedal arm having a first length and a push member, which preferably is a cam-follower arm having a second length which is shorter than the first length. The cam-follower arm is attached to the engage-pedal arm. In a specific version of the embodiment, a disengage-pivot arm having a horizontal stud attached thereto is adjacent the engage-pedal arm. In a more specific version, the cam-follower arm includes first and second holes. A hub having a bore therein is placed in relationship to the support base. A hub-guide pin extends into the hub and attaches to the housing. A stud is attached to the hub and the cam-follower arm is connected to the stud such that the stud is positioned through the cam-follower arm first hole. The stud positioned through the cam-follower arm first hole acts as the main-pivot point for the lift.

In still another embodiment of the invention, at least two filters, each having a first and second end, are stacked in the housing such that the second end of the first filter is engaged with the first end of the second filter. The push device seals the second end of the first filter to the first end of the second filter and the second end of the second filter to the contact surface.

In a preferred embodiment of the invention, the dust collector comprises a housing that encloses clean-air and dirty-air chambers. A support base having an upper side and an underside is located within the housing. A wall surface is spaced from the support base and faces the upper side thereof An elongate annular filter is vertically engaged between the upper side of the support base and the wall surface while a lift device secured with respect to the housing engages the underside of the support base such that the filter is sandwiched and sealed between the support base and the wall surface.

In another embodiment of this invention, the support base has an outer edge and a plurality of guide pins are located around the outer edge to locate the filter on the support base.

In still another embodiment of the invention, the lift device is further comprised of an engage-pedal arm having a first length and a cam-follower arm, which is shorter in length than the engage-pedal arm, connected to the engage-pedal arm. In a more specific version of this preferred embodiment, a disengage-pivot arm is adjacent to the engage-pedal arm. The disengage-pivot arm includes a horizontal stud attached thereto.

In a more specific version of such embodiment, the cam-follower arm includes a first and a second hole. A hub having a bore therein is placed in relationship to the support base and a hub-guide pin extends from the hub and attaches to the housing. The embodiment includes a stud attached to the hub which allows the cam-follower arm to be connected to the stud in such a manner that the stud positioned in the cam-follower arm first hole acts as the main-pivot point for the lift device.

In the more preferred embodiment of the invention, at least two filters, each having a first and second end, are stacked in the housing. In such an arrangement, the first and second ends of the second filter and the second end of the first filter are open so as to allow the air that has been filtered to pass into the clean-air chamber. In one version of this embodiment, the first end of the first filter is enclosed by a cover. In such embodiment, the second end of the first filter is engaged with the first end of the second filter in such a manner that, once engaged, the lift device seals the second end of the first filter to the first end of the second filter and the second end of the second filter to the contact surface. In a more particular version of this embodiment, the second end of the second filter is also open. In this version, engagement of the lift device would result in the sealing of the first end of the first filter with the support base.

BRIEF DESCRIPTION OF THE DRAWINGS

The drawings furnished herewith illustrate a preferred construction of the present invention in which the above advantages and features are clearly disclosed as well as others which will be readily understood from the following description of the illustrated embodiments.

In the drawings.

DETAILED DESCRIPTION OF THE PREFERRED EMBODIMENTS

Figure 1:
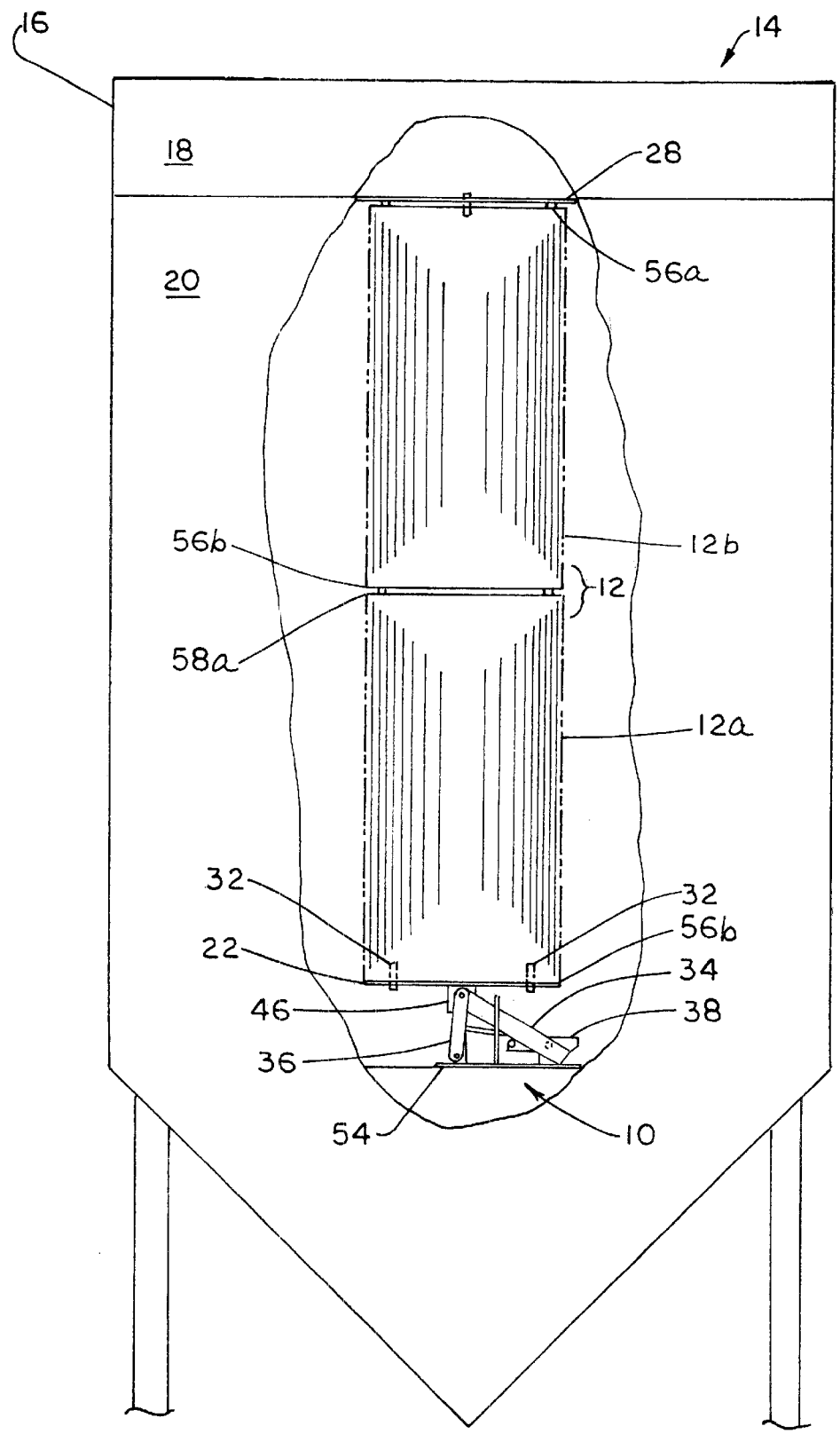
FIG. 1 is a cut-away view of the inside of a dust collector housing showing an exemplary filter engagement device in the high-lift position.

FIGS. 1–5 show the invention which involves a push, or lift device 10 that is used to seal a filter or filters 12 within a dust collector 14. Device 10 is also referred to herein as a hold-release device 10. The invention is shown in use with a dust collector 14 that has a housing 16 which encloses clean-air and dirty-air chambers 18, 20. A support base 22 is included in the housing 16. Such support base 22 has a support side 24 and an opposite side 26. A contact surface 28 is spaced from the support base 22 and faces the support side 24. An elongate annular filter 12 is located and engaged between the support side 24 and the contact surface 28, and a push device 10 secured with respect to the housing 16 engages the opposite side 26 of the support base 22, whereby the filter 12 is sandwiched and sealed between the support base 22 and the contact surface 28. The hold-release device 10 is preferably operable between a "hold" position in which the filter 12 is held in place between support side 24 and contact surface 28 permitting operation of the dust collector 14 and a "removal" position in which the support side 24 and contact surface 28 are spaced such that the filter 12 may be removed for purposes such as replacement or service.

Figure 4:
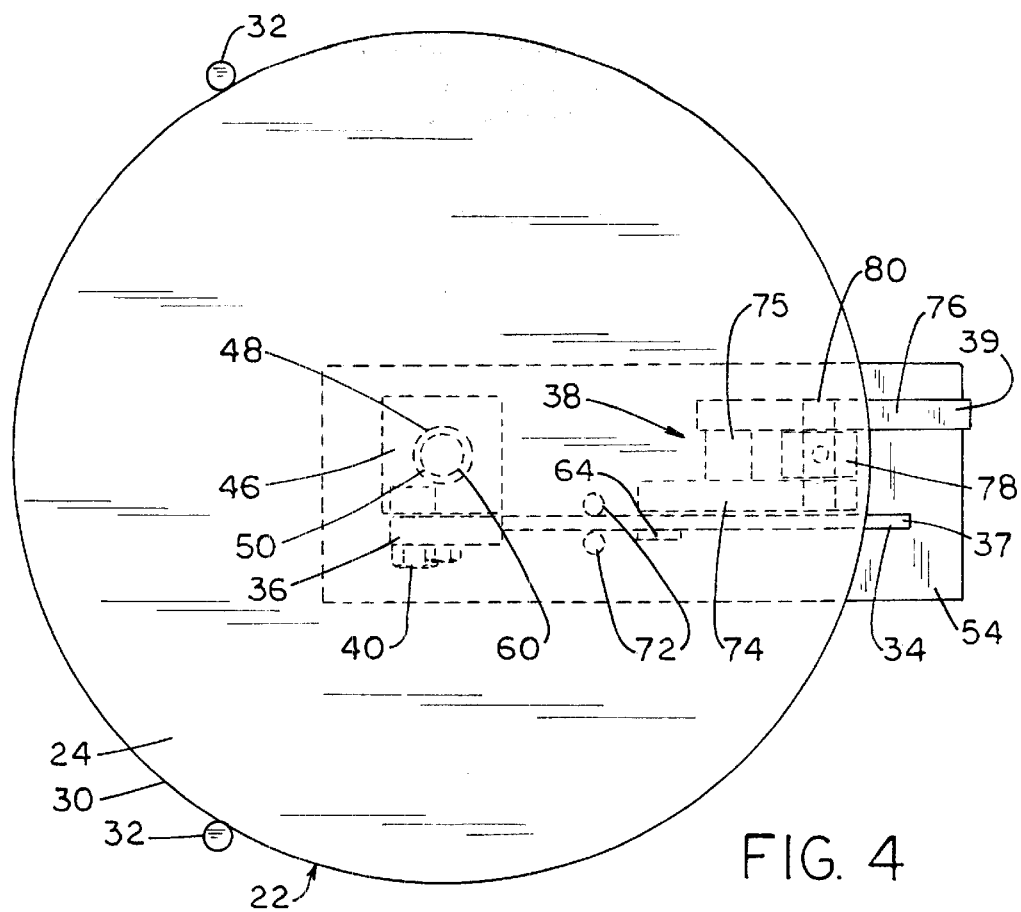
FIG. 4 is a top view of the support base showing the filter engagement device in the high-lift position.

In one embodiment of the invention, the contact surface 28 includes an opening (not shown) in communication with clean air chamber 18. As shown in FIG. 4, the support base 22 has an outer edge 30 and a plurality of guide pins 32 are located around the outer edge 30 such that a filter 12 positioned on the support base 30 between the guide pins 32 is centered with respect to the opening in the contact surface 28. This positioning allows a clean-air chamber 18 to be formed between the inside of the filter 12 and the clean air chamber 18 area opposite the contact surface 28. In another embodiment of the invention, the push device 10 is further comprised of an engage-pedal arm 34 having a first length and a push member, preferably in the form of a cam-follower arm 36 connected to the engage-pedal arm 34. In this embodiment, the cam-follower arm 36 is shorter in length than the engage-pedal arm 34. In a specific version of the embodiment, a disengage-pivot arm 38 is adjacent the engage-pedal arm 34. The disengage-pivot arm 38 includes a stud 64 that extends horizontally from the disengage arm 38.

Figure 2:
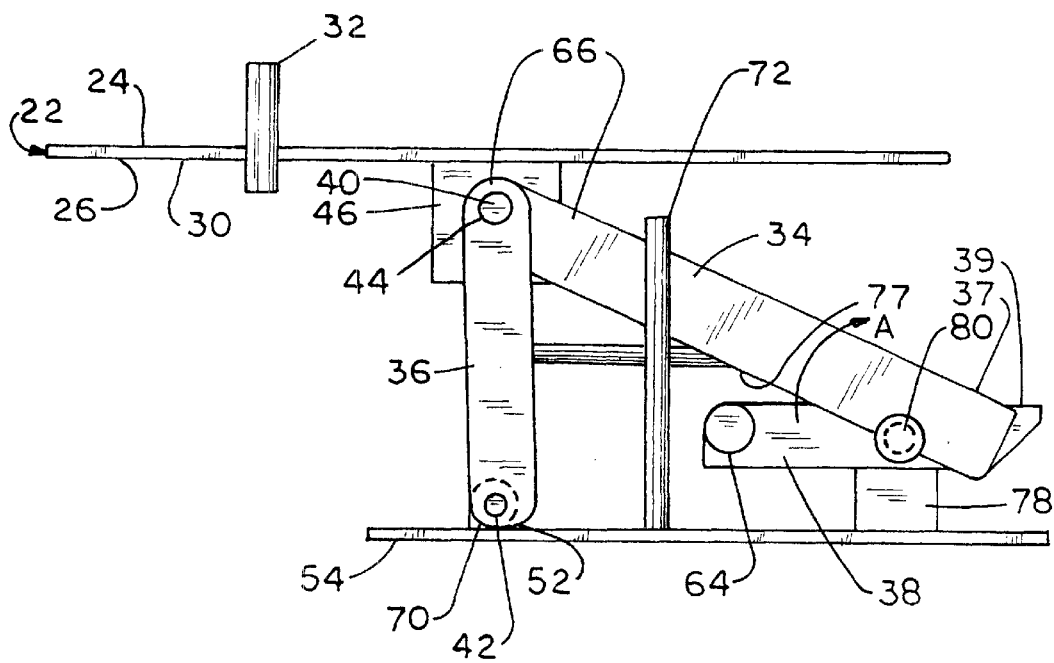
FIG. 2 is a front view of the filter engagement device showing the device in the high-lift position.
Figure 3:
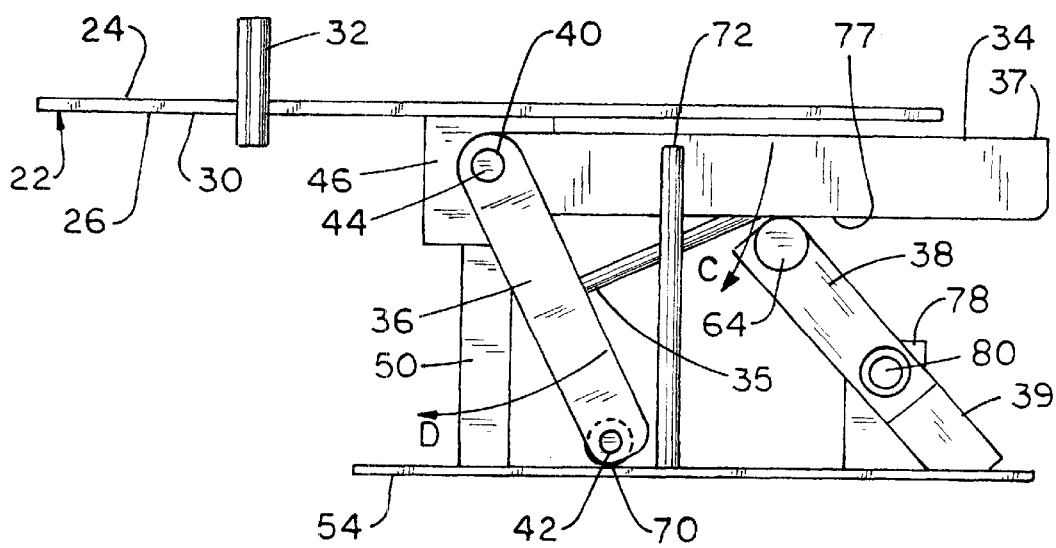
FIG. 3 is a front view of the filter engagement device showing the device in the low-lift position.
Figure 5:
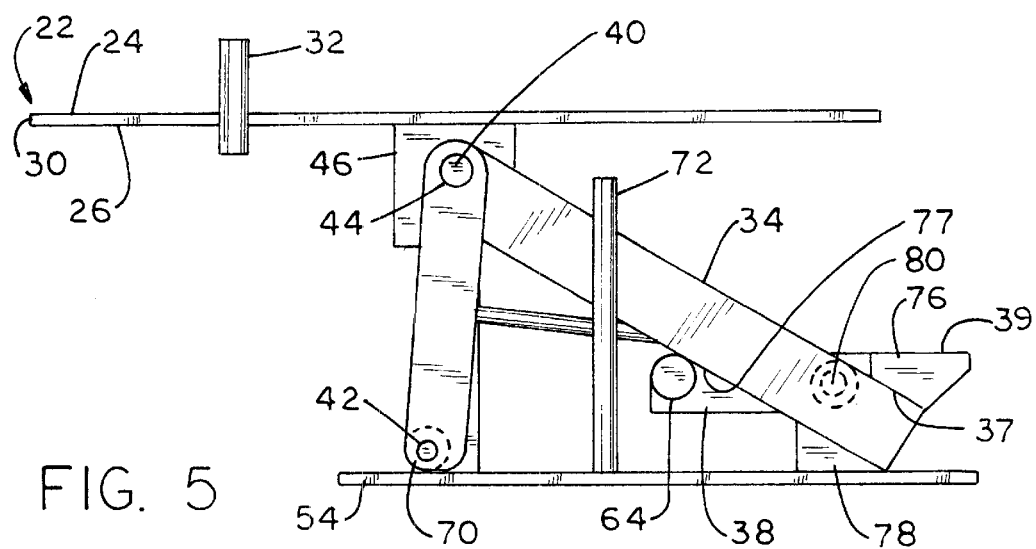
FIG. 5 is a front view of the filter engagement device showing the device in the high-lift position with the cam-follower arm rotated past the vertical position.

In a more specific version, the cam-follower arm 36 includes a first and second hole 44, 42. A hub 46 having a bore 48 therein is placed in relationship to the support base 22 and a hub-guide pin 50 extends from the hub 46 and attaches to the housing 16 or, for example, to plate 54 as shown in FIGS. 2–3 and 5. A stud 40 is attached to the hub 46. The cam-follower arm 36 is connected to the stud 40 such that the stud 40 positioned in cam-follower first hole 44 acts as the main-pivot point for the device 10.

In another embodiment of the invention, the push device 10 is further comprised of an engage-pedal arm 34 having a first length and a cam-follower arm 36 connected to the engage-pedal arm 34. In this embodiment, the cam-follower arm 36 is shorter in length than the engage-pedal arm 34. In a specific version of the embodiment, a disengage-pivot arm 38 is adjacent the engage-pedal arm 34. The disengage-pivot arm 38 includes a stud 64 that extends horizontally from the disengage arm 38.

In a more specific version, the cam-follower arm 36 includes a first and second hole 44, 42. A hub 46 having a bore 48 therein is placed in relationship to the support base 22 and a hub-guide pin 50 extends from the hub 46 and attaches to the housing 16 or, for example, to plate 54 as shown in FIGS. 2–3 and 5. A stud 40 is attached to the hub 46 and the cam-follower arm 36 is connected to the stud 40 such that the stud 40 is positioned in cam-follower first hole 44 and acts as the main-pivot point for the push device 10.

Initially, filter 12 is mounted between support base 22 and contact surface 28 in a "hold" position by the action of device 10. To disengage the lifting device, an operator enters the housing 16 through a doorway or entry port (not shown). Once inside the housing, the operator steps on the disengage-pivot arm 38 along foot-contact portion 39. This causes the disengage-pivot arm 38 to rotate in a clockwise manner as shown by arrow A in FIG. 2. As a result of stepping on the disengage-pivot arm 38, the horizontal stud 64 extending from the disengage arm 38 applies force to the engage-pedal arm 34. This force causes the engage-pedal arm 34 to rotate upward which in turn causes the cam-follower arm 36 to rotate out of the detent 52 in a counter-clockwise direction as shown by arrow B. At the same time, the engage-pedal arm 34 rotates about the main-pivot point at stud 40 thereby allowing cam-follower arm 36 to rotate in the counter-clockwise direction indicated by arrow B. This action releases the support base 22 and causes the hub 46 and the support base 22 to be lowered along the hub-guide pin 50, thereby causing the main-pivot point to be lowered along with the hub 46. This position is shown in FIG. 3. The position is referred to as the low lift or "remove" position because, in this position, force applied against the filter 12 is released and the filter 12 may be removed from its position between support base 22 and contact surface 28.

In still another embodiment of the invention, at least two filters 12(a), 12(b), each having a first and second end 56,58, are stacked in the housing 16. In such an arrangement, the first and second ends 56(b), 58(b) of filter 12(b) and the second end 58(a) of filter 12(a) are open so as to allow the air that has been filtered to pass into the clean-air chamber 18. In one version of this embodiment, the first end 56(a) of filter 12(a) is enclosed by a cover (not shown). In this embodiment, the second end 58(a) of the first filter 12(a) is engaged with the first end 56(b) of the second filter 12(b) in such a manner that, once engaged, the push device 10 seals the second end 58(a) of the first filter 12(a) to the first end 56(b) of the second filter 12(b) and the second end 58(b) of the second filter 12(b) to the contact surface 28.

In another particular version of this embodiment, the first end 56(a) of filter 12(a) is also open. In this version, engagement of the push device 10 would result in the sealing of the first end 56(a) of filter 12(a) with the support base 22.

It is to be understood that in keeping with the spirit of the invention, more than two filters could be stacked together should the need arise.

In a preferred embodiment of the invention, the dust collector 14 comprises a housing 16 that encloses clean-air and dirty-air chambers 18, 20. A support base 22 having an upper side 24 and an underside 26 is located within the housing 16 and a wall surface 28 facing the upper side 24 is spaced from the support base 22. An elongate annular filter 12 is vertically positioned and engaged between the upper side 24 of the support base 22 and the wall surface 28. A lift device 10 secured with respect to the housing 16 engages the underside 26 of the support base 22 such that the filter 12 is sandwiched and sealed between the support base 22 and the wall surface 28.

In another embodiment of this invention, the support base 22 has an outer edge 30 and a plurality of guide pins 32 are located around the outer edge 30. This arrangement of guide pins 32 allows the filter 12 to be directly aligned with the opening (not shown) in the center of the wall surface 28 so that the inside of the filter 12 is in communication with clean-air chamber 18.

In still another embodiment of the invention, the lift device 10 is further comprised of an engage-pedal arm 34 having a first length and a cam-follower arm 36, which is shorter in length than the engage-pedal arm 34. Engage-pedal arm 34 is connected to the engage-pedal arm 34. Strut 35 rigidly supports the connection between engage-pedal arm 34 and cam-follower arm 36. In a more specific version of this preferred embodiment, a disengage-pivot arm 38 is adjacent to the engage-pedal arm 34. The disengage-pivot arm 38 includes a horizontal stud 64 attached thereto.

In a more specific version of such embodiment, the cam-follower arm 36 includes a first and second hole 44, 42. A hub 46 having a bore 48 therein is placed in relationship to the support base 22 and a hub-guide pin 50 extends from the hub 46 and attaches to the housing 16. This embodiment includes a stud 40 attached to the hub 46 which allows the cam-follower arm 36 to be connected to the stud 40 such that the stud 40 positioned in cam-follower arm 36 first hole 44 acts as the main-pivot point for the lift device 10.

In the more preferred embodiment of the invention, at least two filters 12(a), 12(b), each having a first and second end 56, 58 are stacked in the housing 16. In such an arrangement, the first and second ends 56(b), 58(b) of filter 12(b) and the second end 58(a) of filter 12(a) are open so as to allow the air that has been filtered to pass into the clean-air chamber 18. In one version of this embodiment, the first end 56(a) of filter 12(a) is enclosed by a cover (not shown). In such version, the second end 58(a) of filter 12(a) is engaged with the first end 56(b) of the second filter 12(b) in such a manner that, once engaged, the device 10 seals the second end 58(a) of the first filter 12(a) to the first end 56(b) of the second filter 12(b) and the second end 58(b) of the second filter 12(b) to the wall surface 28.

In a more particular version of this embodiment, the first end 56(a) of the first filter 12(a) is also open. In this version, engagement of the device 10 would result in the sealing of the first end 56(a) of first filter 12(a) with the support base 22.

When operating in the most preferred embodiment, as shown in FIG. 1, a stack of two vertically positioned filters 12(a), 12(b) is placed on the round support base 22 which, due to the hub 46 located on its underside 26, is capable of being moved in a vertical upward direction. A plurality of filter-guide pins 32 placed at a distance apart from each other at a fixed radius from the center of the round support base 22 are used to center the filters 12(a), 12(b) with respect to the opening (not shown) in the wall surface or cage plate 26.

The hub 46 includes a bore 48 which is concentrically placed in relationship to the round support-base plate 22. A bushing 60 is pressed into the bore 48 and a vertically directed hub-guide pin 50 extends into the inside diameter of the bushing 60. This hub-guide-pin 50 is fixed to the roller-base plate 54 and provides guidance as the round support-base plate 22 travels vertically upward to the high-lift, or "hold" position shown for example in FIG. 2.

A round stud 40 is also attached to a horizontal side of the hub 46. This stud 40 extends for a distance that is approximately equal to the thickness of the main-pivot arm configuration 66 to which it is connected. The main-pivot arm configuration 66 consists of two attached members which are a short cam-follower arm 36 and the long engage-pedal arm 34. These two arms are also attached in an arrangement that is less than 90° apart. Once in the high-lift position, as shown in FIGS. 1 and 2, the short cam-follower arm 36 is positioned vertically and the engage-pedal arm 34 is sloped downward. In another version of this embodiment, as shown in FIG. 5, the cam-follower arm 36 extends slightly beyond vertical (i.e., to the 6:30 position), thereby forming a natural lock between the cam-follower arm 36 and the roller-base plate 54.

Two holes 44,42 are located in the short cam-follower arm 36. These holes 44,42 are arranged such that when in the high-lift position the upper hole 44 contains a bushing (not shown) which is connected onto the horizontal round stud 40. The center of the stud 40 in upper hole 44 is the location of the main-pivot point for operating the main-pivot arm configuration 66.

In order to transition to the high-lift, or hold, position, the operator pushes downward on the engage-pedal arm 34 with his foot at pedal portion 37 which is along a distal portion of the arm 34. This causes the engage-pedal arm 34 to rotate clockwise as shown by arrow C in FIG. 3. This rotation of the engage-pivot arm 34 pivots the cam-follower arm 36 into a vertical position as shown by arrow D holding a filter 12 positioned between support side 24 and contact surface 28 firmly in place. When in this position, cam-follower roller 70 inserted into hole 42 in cam-follower arm 36 rolls along roller base 54 or bottom wall of the housing 16 causing cam-follower arm 36 to urge support base 22 toward contact surface 28.

In the low-lift or removal position, as shown in FIG. 3, the engage-pedal arm 34 extends out horizontally beyond the outside diameter of the filter 12 thereby allowing the operator's foot to easily push the engage-pedal arm 34 downward. When the engage-pedal arm 34 is horizontal, the angle between the cam-follower arm 36 and the hub-guide pin 50 is preferably about 30°. Since the engage-pedal arm 34 and the cam-follower arm 36 are attached together in less than a 90° configuration (and preferably 60°), the downward rotational motion of the engage-pedal arm 34 causes upward linear motion of the hub 46. Obviously, the longer the cam-follower arm 36 the greater the distance between the support base 22 and the roller-base plate 54, thus resulting in a longer upward-linear stroke of the hub 46 and the support base 22 for the same rotational movement of the main-pivot-arm configuration 66. This upward-vertical-linear motion is related to the angle between the engage-pedal arm 34 and the cam-follower arm 36, the length of the cam-follower arm 36, and the rotational distance traveled by the main-pivot-arm configuration 66. Thus, when the operator exerts a downward push on the engage-pedal arm 34, a fixed angular rotation occurs about the main pivot point.

As shown in FIGS. 1 and 2, when the engage-pedal arm 34 engages the roller-base plate 54 in the high-lift or hold position, the cam-follower arm 36 simultaneously reaches its vertical position thereby providing the cam-follower arm 36 its maximum upward movement. Once in this position, the cam-follower roller 70 also seats itself into a radiused detent 52 in the roller-base plate 54 or housing 16. This detent 52 prevents the main-pivot arm configuration 66 from reversing itself In a specific version of this embodiment, as shown in FIG. 5, the cam-follower arm 36 extends slightly beyond vertical i.e., to the 6:30 position, thereby forming a natural lock between the cam-follower arm 36 and the roller-base plate 54.

To help guide the engage-pedal arm 34 downward, two vertical-pedal-arm-guide pins 72 extend from the roller-base plate 54 upward to slightly above the engage-pedal arm 34. These vertical-guide pins 72 are spaced on each side of the engage-pedal arm 34 in order to prevent the main-pivot arm configuration 66 from rotating left or right when the operator applies a vertical downward pressure with his foot.

FIGS. 3 and 4 show the disengage-pivot arm 38 which is used to release the main-pivot arm configuration 66 and lower the support-base plate 22. In the preferred embodiment, the disengage-pivot arm 38 is located next to the engage-pedal arm 34 and includes both a short section of arm 74 as measured from the center of the disengage-pivot-arm base 78 and a long section 76 located on the opposite side of the disengage-pivot arm base 78. At one end of the short section of the arm 74, as shown in FIG. 4, a hole is located for a pivot point while at the opposite end, a horizontal round stud 64 extends from the side of the short section disengage-pivot arm 74 to a contact surface portion 77 along a lower side of the engage-pedal arm 34.

Furthermore, in the preferred embodiment, as shown in FIG. 4, both the short and long sections 74, 76 of the disengage-pivot arm 38 are arranged such that they share, on a horizontal axis, the center line of the disengage-pivot-arm base 78. In such embodiment, the disengage-pivot-arm base 78 is located between the short and long sections 74, 76 of the disengage-pivot arm 38, and the disengage-pivot-arm pin 80 extends horizontally through the short and long sections 74, 76 of the disengage-pivot arm 38 as well as the disengage-pivot-arm base 78.

In the preferred embodiment, as shown in FIGS. 1, 4 and 5, when the device is in the high-lift position, the long section 76 of the disengage-pivot arm 38 extends horizontally adjacent to the engage-pedal arm 34. In order to make the disengage-pivot arm 38 more rigid, a short horizontal piece 75 connects both the short 74 and long sections 76 of the disengage-pivot arm 38. By spacing the long section 76 of the disengage arm 38 from the engage-pedal arm 34, the operator will have more clearance to press only the disengage-pivot arm 38. When the operator presses the disengage-pivot arm 38 with his foot, he causes the arm to rotate downward. This causes the horizontal stud 64 on the short section 74 of the disengage-pivot arm 38 to contact, in a upward direction, a contact surface portion 77 of the long engage-pedal arm 34. The result is an upward lifting force that causes the long engage-pedal arm 34 to rotate upward and about the main-pivot point in the hub 46 that is attached to the support-base plate 22. As the long engage-pedal arm 34 rotates upward, the attached cam-follower arm 36 rotates counter-clockwise in the direction of arrow B (FIG. 2) which allows the support-base plate 22 with the stack of filters 12 to be lowered to the "remove" position. This action permits filter 12 to be removed from between support base 22 and contact surface 28 and a new filter to be placed therebetween.

While the principles of the invention have been shown and described in connection with but a few embodiments, it is to be understood clearly that such embodiments are by way of example and not limiting. Various modes of carrying out the invention are contemplated as being within the scope of the following claims particularly pointing out and distinctly claiming the subject matter which is regarded as the invention.

What is claimed is:

1. A dust collector comprising a housing enclosing clean-air and dirty-air chambers, a support base in the housing movable toward and away from a contact surface and having a support side and an opposite side, an outer edge and a plurality of guide pins located around said outer edge, the contact surface being spaced from the support base facing the support side thereof and including an opening, an elongate annular filter engaged between the support side and the contact surface, and a push device secured with respect to the housing and engaging the opposite side of the support base to (a) apply a force urging the support base toward the contact surface to hold the filter therebetween and (b) release the force permitting the support base to move away from the contact surface, whereby, when the force is applied, the filter is sandwiched and sealed with respect to the contact surface and the filter positioned on the support base is centered with respect to the opening in the contact surface.

2. A dust collector comprising a housing enclosing clean-air and dirty-air chambers, a support base in the housing movable toward and away from a contact surface and having a support side and an opposite side, the contact surface being spaced from the support base and facing the support side thereof an elongate annular filter engaged between the support side and the contact surface, and a push denice secured with respect to the housing and engaging the opposite side of the support base to (a) apply a force urging the support base toward the contact surface to hold the filter therebetween and (b) release the force permitting the support base to move away from the contact surface, said push device including a cam surface spaced apart from the support base, an engage-pedal arm having a first length, a cam-follower arm connected to the engage-pedal arm along a first end and movably engaged with the cam surface along a second end, the cam follower arm having a second length which is less than the first length whereby, when the engage pedal arm is moved in a first direction, the cam follower arm acts against the support base and cam surface to apply the urging force causing the filter to be sandwiched and sealed with respect to the contact surface.

3. The device of claim 2 further comprising a disengage-pivot arm adjacent the engage-pedal arm, the disengage-pivot arm having a stud projecting outwardly therefrom positioned for engagement with the engage pedal arm such that force applied by the stud to the engage pedal arm releases the force applied to the support base by the cam follower arm.

4. The device of claim 2 wherein:
the support base includes a hub having a bore therein positioned along the support base opposite side.
a hub guide pin is secured with respect to the housing at one end and extends into the hub bore permitting the support base to ride along the guide pin toward and away from the contact surface;
a stud projects outwardly from the hub and is journaled in the cam-follower arm along the cam-follower arm first end; and
the journal stud acts as the main pivot point for the push device.

5. The device of claim 2 wherein the cam-follower arm and engage-pedal arm are connected in such a manner that the an angle formed between the cam-follower arm and the engage-pedal arm is less than 90°.

6. The device of claim 2 wherein:
at least two filters, each having a first and second end, are stacked in the housing such that the second end of the first filter is engaged with the first end of the second filter; and
the push divice seals the second end of the first filter to the first end of the second filter and the second end of the second filter to the contact surface.

7. A dust collector with filter-mounting apparatus comprising:
a housing including clean-air and dirty-air chambers;
filter structure having first and second ends and inner and outer portions one of which is in communication with the clean-air chamber and the other of which is in communication with the dirty-air chamber;
a contact surface positioned with respect to the housing, said contact surface being adapted to support the filter first end;
a movable support base positioned with respect to the housing and spaced apart from the contact surface, said support base having a support side adapted to support the filter second end, said support base being mounted for movement toward and away from the contact surface between (a) a hold position in which the support base and contact surface coact to hold the filter between them and (b) a removal of the filter, and a hold-release device acting against the support base including:
a plate positioned adjacent the support base;
a push member extending between the plate and the support base, said push member being laterally movable between the hold position in which the push member acts against the plate and support base to urge the support base toward the contact surface and the removal position in which the support base is further away from the contact surface; and
a movement arm secured to the push member and mounted for back and forth movement to move the push member laterally between the hold and removal positions.

8. The device of claim 7 wherein the push member and movement arm ar pivotably secured with respect to the support base.

9. The device of claim 8 wherein the movement arm has a distal portion which when moved downwardly moves the push member into its hold position and when it moves upwardly moves the push member into its removal position.

10. The device of claim 9 wherein the push member has a roller secured along the distal portion, said roller being mounted for rotational movement along the plate.

11. The device of claim 7 further including:
a fixed guide pin projecting away from the plate; and
a hub on a support base central portion having a bore sized to receive the guide pin, the support base being mounted for axial movement along the guide pin toward and away from the contact surface.

12. The device of claim 11 wherein:
the push member is a cam-follower arm;
the movement arm is rigidly secured to the cam-follower arm; and
the movement arm and cam-follower arm are pivotably secured with respect to the support base hub such that, in the hold position, the cam-follower arm is pivoted by the movement arm in a first direction to urge the support base toward the contact surface along the guide pin and, in the removal position, the cam-follower arm is pivoted by the movement arm in a second direction permitting the support base to move away from the contact surface along the guide pin.

13. The device of claim 12 further including a disengagement member for disengaging the hold-release device comprising:
a lever arm pivotably mounted to a base and having first and second ends;
a stud projecting away from the lever arm first end and having a contact surface in alignment with a movement arm contact surface; and
the lever arm is movable between a first position in which the stud contacts the movement arm contact surface and urges the movement arm to the removal position and a second position in which the lever arm permits the movement arm to remain in the hold position.

14. The device of claim 13 wherein:
the lever arm a adjacement the movement arm; and
the lever arm second end includes a foot-contact portion.

15. The device of claim 7 further including a disengagement member for disengaging the hold-release device comprising:
a lever arm pivotably mounted to a base and having first and second ends;
a stud projecting away from the lever arm first end and having a contact surface in alignment with a movement arm contact surface; and the lever arm in movable between a first position in which the stud contacts the movement arm contact surface and urges the movement arm to the removal position and a second position in which the lever arm permits the movement arm to remain in the hold position.

16. The device of claim 15 wherein:

the lever arm is adjacement the movement arm; and the lever arm second end includes a foot-contact portion.

17. The device of claim 7 wherein:

the contact surface has an opening in communication with the clean air chamber; and the support base includes at least one guide pin positioned in registry with the filter when the filter is on the support base, the at least one guide pin locating the filter on the support base so that the filter inner portion is in communication with the opening and clean air chamber when the filter is in the hold position.

18. The device of claim 17 wherein:

the support base has an outer edge;

the guide pins comprise a plurality of guide pins; and the guide pins are secured around the support base outer edge and project toward the contact surface such that the guide pins contact the filter second end and coact to locate the filter on the support base.

* * * * *

UNITED STATES PATENT AND TRADEMARK OFFICE
CERTIFICATE OF CORRECTION

PATENT NO.    : 6,444,005 B1
DATED         : September 3, 2002
INVENTOR(S)   : Glenn W. Bitner It is certified that error appears in the above-identified patent and that said Letters Patent is hereby corrected as shown below:

Column 9,
Line 1, delete "denice" and insert -- device --;
Line 67, delete "of the filter, and" and insert -- position in which the support base is further away from the contact surface permitting removal of the filter; and --;

Column 10,
Line 15, delete "ar" and insert -- are --;

Column 11,
Line 1, after "arm", delete "in" and insert -- is --.

Signed and Sealed this

Thirteenth Day of May, 2003

JAMES E. ROGAN
*Director of the United States Patent and Trademark Office*